S. D. WOODBURY.
Carriage-Wheel.
No. { 2,805. / 33,809. }
Patented Nov. 26, 1861
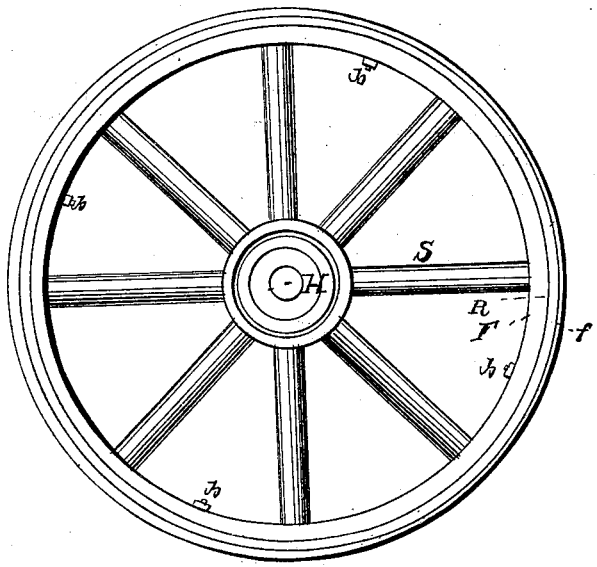

UNITED STATES PATENT OFFICE.

SETH D. WOODBURY, OF LYNN, MASSACHUSETTS.

IMPROVEMENT IN ELASTIC CARRIAGE-WHEELS.

Specification forming part of Letters Patent No. 33,809, dated November 26, 1861.

*To all whom it may concern:*

Be it known that I, SETH D. WOODBURY, of Lynn, in the county of Essex and Commonwealth of Massachusetts, have invented a new and useful Elastic Carriage-Wheel; and I do hereby declare that the following is a full, clear, and exact description of the construction and operation of the same, reference being had to the accompanying drawing, forming a part of this specification.

The nature of my invention consists in making the felly of a carriage-wheel in two concentric parts F $f$ and interposing a belt or layer of india-rubber or other elastic material, or in placing the same between the tire and the periphery of any wheel, by means of which I obtain the following very desirable results, viz: First, as the rubber is compressed by the "shrinking on" of the tire, it follows that (when the tire would become loose by its own expansion or the shrinking of the wood) the compressed rubber will expand, and thereby prevent the tire from coming off or requiring to be "reset," and not only is the expense of resetting saved, but, owing to the elasticity of the felly, a thinner tire will last as long as a much thicker one applied to a common non-elastic wheel; second, the elastic felly by breaking the shock or jar of the wheel in striking against or passing over stones and other hard obstructions renders the spokes much less liable to loosen or break and every part of the wheel more durable; third, by thus making the felly elastic there is much less liability of "springing" or breaking the axle, while all the bolts, screws, and appendages of the same (being relieved of the sudden and constant jarring of the common wheel) are less liable to become loose, so as to rattle and chafe; fourth, the wheels thus made elastic save the carriage a great deal of wear and tear and also render it much easier to ride in, and, fifth, my elastic fellies in passing over pavements or hard and gravelly roads not only diminish the jar, but also muffle the sound, thereby removing much of the disagreeable noise and rattle attending common carriage-wheels.

To enable others skilled in the art to make and use my improvement, I will now proceed to describe its construction and operation.

The drawing represents a side view of one of my wheels, the hub H and spokes S being constructed in all respects like those in common use.

The felly is made in two concentric parts F and $f$. The part $f$ may be a continuous strip or made in sections, and is from one-fourth to one-half an inch in thickness, being made thus thin so as to readily yield. The spokes, as indicated by the dotted lines, pass only through the inner part F of the felly.

Between the two concentric parts F $f$, I place a belt or layer of vulcanized or natural india-rubber or other elastic substance R, from one-fourth to three-eighths of an inch in thickness and as wide as the felly. The tire being then shrunk on in the usual manner and so as to compress the elastic substance R, screw-bolts $b$ are passed through the tire and felly at suitable distances apart and confined by nuts on the inner side.

The method just described of applying the rubber or elastic substance to a wooden wheel I consider as preferable to the other method alluded to above in setting forth the nature of my invention. The rubber or elastic material may, however, it is obvious, be applied to the periphery or felly of any wheel, whether of wood or metal, between it and the tire and with about the same results.

What I claim as my invention, and desire to secure by Letters Patent, is—

Rendering a carriage-wheel elastic by making the felly in two concentric parts F and $f$ and interposing a belt or layer of india-rubber or other elastic material R, substantially as described, and for the objects specified.

SETH D. WOODBURY.

Witnesses:
 N. AMES,
 WM. HOWLAND.